US 9,256,875 B2

(12) United States Patent
Dixon et al.

(10) Patent No.: US 9,256,875 B2
(45) Date of Patent: Feb. 9, 2016

(54) PROCESSING TRANSACTIONS OF DIFFERENT PAYMENT DEVICES OF THE SAME ISSUER ACCOUNT

(71) Applicants: Phil Dixon, San Diego, CA (US); Ayman A. Hammad, Pleasanton, CA (US); Khalid El-Awady, Mountain View, CA (US)

(72) Inventors: Phil Dixon, San Diego, CA (US); Ayman A. Hammad, Pleasanton, CA (US); Khalid El-Awady, Mountain View, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 14/611,061

(22) Filed: Jan. 30, 2015

(65) Prior Publication Data

US 2015/0154602 A1    Jun. 4, 2015

Related U.S. Application Data

(63) Continuation of application No. 13/564,625, filed on Aug. 1, 2012, now Pat. No. 8,973,818, which is a continuation of application No. 11/681,179, filed on Mar. 1, 2007, now Pat. No. 8,256,666.

(60) Provisional application No. 60/887,307, filed on Jan. 30, 2007.

(51) Int. Cl.
*G06K 5/00*    (2006.01)
*G06Q 20/40*    (2012.01)
(Continued)

(52) U.S. Cl.
CPC .......... *G06Q 20/4016* (2013.01); *G06Q 20/027* (2013.01); *G06Q 20/04* (2013.01);
(Continued)

(58) Field of Classification Search
USPC .................................................. 235/380, 492
See application file for complete search history.

(56) References Cited

U.S. PATENT DOCUMENTS

| 5,043,561 A | 8/1991 | Kimata |
| 5,485,520 A | 1/1996 | Chaum et al. |

(Continued)

FOREIGN PATENT DOCUMENTS

| AU | 2007345585 | 3/2012 |
| JP | 10188058 A | 7/1998 |

(Continued)

OTHER PUBLICATIONS

ISO/I EC 7812 Standard. [online] Jan. 27, 2007. Retrieved from the Internet: <URL:en.wikipedia.org/w/index.php?title=IS0/1 EC 7812& oldid= 1 03608433.

(Continued)

*Primary Examiner* — Rafferty Kelly
(74) *Attorney, Agent, or Firm* — Kilpatrick Townsend & Stockton LLP

(57) ABSTRACT

Each portable payment device associated with a single account within a payment processing system is distinguished using track data. The track data from the portable payment device is read at each of a plurality of merchant point of sale terminals (POS). Rather than relying on the PAN alone, a merchant may utilizes the track data, or a proxy thereof, as the unique identifier for the portable payment device. The merchant may then process transactions involving the portable payment device based on the unique identifier. For example, in the transit environment the transit fare for each rider with different portable payment devices but the same account can be calculated using the unique identifier, such as the full track data read from both tracks of the corresponding portable payment devices.

20 Claims, 7 Drawing Sheets

(51) Int. Cl.
*G06Q 20/02* (2012.01)
*G06Q 20/04* (2012.01)
*G06Q 20/08* (2012.01)
*G06Q 20/20* (2012.01)
*G06Q 20/32* (2012.01)
*G06Q 20/34* (2012.01)
*G06Q 20/38* (2012.01)
*G07B 15/00* (2011.01)

(52) U.S. Cl.
CPC ......... *G06Q 20/085* (2013.01); *G06Q 20/0855* (2013.01); *G06Q 20/20* (2013.01); *G06Q 20/204* (2013.01); *G06Q 20/32* (2013.01); *G06Q 20/327* (2013.01); *G06Q 20/341* (2013.01); *G06Q 20/382* (2013.01); *G06Q 20/3821* (2013.01); *G06Q 20/40* (2013.01); *G06Q 20/401* (2013.01); *G07B 15/00* (2013.01)

(56) References Cited

U.S. PATENT DOCUMENTS

| | | | |
|---|---|---|---|
| 5,801,943 | A | 9/1998 | Nasburg |
| 5,897,621 | A | 4/1999 | Boesch et al. |
| 5,991,749 | A | 11/1999 | Morrill |
| 6,097,292 | A | 8/2000 | Kelly et al. |
| 6,185,307 | B1 | 2/2001 | Johnson, Jr. |
| 6,205,433 | B1 | 3/2001 | Boesch et al. |
| 6,577,229 | B1 | 6/2003 | Bonneau et al. |
| 6,609,655 | B1 | 8/2003 | Harrell |
| 6,629,591 | B1 | 10/2003 | Griswold et al. |
| 6,655,587 | B2 | 12/2003 | Andrews et al. |
| 6,792,536 | B1 | 9/2004 | Teppler |
| 7,092,697 | B1 | 8/2006 | Kupsh et al. |
| 7,367,494 | B2 | 5/2008 | Macklin et al. |
| 7,374,082 | B2 | 5/2008 | Van de Velde et al. |
| 7,567,920 | B2 | 7/2009 | Hammad et al. |
| 7,599,522 | B2 | 10/2009 | Ito |
| 7,617,977 | B2 | 11/2009 | Mathews, III et al. |
| 7,809,652 | B2 | 10/2010 | Dixon et al. |
| 7,873,594 | B2 | 1/2011 | Harada et al. |
| 7,992,179 | B1 | 8/2011 | Kapner, III et al. |
| 7,996,271 | B2 | 8/2011 | Chan et al. |
| 8,256,666 | B2 | 9/2012 | Dixon et al. |
| 8,407,082 | B2 | 3/2013 | Dixon et al. |
| 8,412,640 | B2 | 4/2013 | Dixon et al. |
| 8,448,852 | B2 | 5/2013 | Dixon et al. |
| 8,746,556 | B2 | 6/2014 | Dixon et al. |
| 8,973,818 | B2 | 3/2015 | Dixon et al. |
| 2002/0029165 | A1 | 3/2002 | Takatori et al. |
| 2002/0046173 | A1 | 4/2002 | Kelly |
| 2002/0078152 | A1 | 6/2002 | Boone |
| 2002/0128967 | A1 | 9/2002 | Meyer et al. |
| 2002/0145050 | A1 | 10/2002 | Jayaratne et al. |
| 2002/0161729 | A1 | 10/2002 | Andrews |
| 2003/0036997 | A1 | 2/2003 | Dunne |
| 2003/0080186 | A1 | 5/2003 | McDonald et al. |
| 2003/0093305 | A1 | 5/2003 | Davis et al. |
| 2003/0229506 | A1 | 12/2003 | Scott et al. |
| 2003/0229590 | A1 | 12/2003 | Byrne et al. |
| 2004/0016801 | A1 | 1/2004 | Newsome et al. |
| 2004/0039697 | A1 | 2/2004 | Vilmos |
| 2004/0054622 | A1 | 3/2004 | Strayer et al. |
| 2004/0103057 | A1 | 5/2004 | Melbert et al. |
| 2004/0193460 | A1 | 9/2004 | Ducholet et al. |
| 2004/0210476 | A1 | 10/2004 | Blair et al. |
| 2004/0210498 | A1 | 10/2004 | Freund |
| 2004/0236646 | A1 | 11/2004 | Wu et al. |
| 2005/0033688 | A1 | 2/2005 | Peart et al. |
| 2005/0103839 | A1 | 5/2005 | Hewel |
| 2005/0109838 | A1 | 5/2005 | Linlor |
| 2005/0121511 | A1 | 6/2005 | Robbins et al. |
| 2005/0192815 | A1 | 9/2005 | Clyde |
| 2005/0234778 | A1 | 10/2005 | Sperduti et al. |
| 2005/0289231 | A1 | 12/2005 | Harada et al. |
| 2006/0163345 | A1 | 7/2006 | Myers et al. |
| 2006/0178986 | A1 | 8/2006 | Giordano et al. |
| 2006/0224470 | A1 | 10/2006 | Garcia Ruano et al. |
| 2006/0243796 | A1 | 11/2006 | Macklin et al. |
| 2006/0253581 | A1 | 11/2006 | Dixon et al. |
| 2006/0278704 | A1* | 12/2006 | Saunders ............... G06Q 20/10 235/382 |
| 2007/0075140 | A1 | 4/2007 | Guez et al. |
| 2007/0078782 | A1 | 4/2007 | Ono et al. |
| 2007/0131761 | A1 | 6/2007 | Smets et al. |
| 2007/0179859 | A1 | 8/2007 | Chan et al. |
| 2007/0233615 | A1 | 10/2007 | Tumminaro |
| 2008/0040274 | A1 | 2/2008 | Uzo |
| 2008/0128513 | A1 | 6/2008 | Hammad et al. |
| 2008/0156873 | A1 | 7/2008 | Wilhelm et al. |
| 2008/0179394 | A1 | 7/2008 | Dixon et al. |
| 2008/0179395 | A1 | 7/2008 | Dixon et al. |
| 2008/0183565 | A1 | 7/2008 | Dixon et al. |
| 2008/0183589 | A1 | 7/2008 | Dixon et al. |
| 2008/0183622 | A1 | 7/2008 | Dixon et al. |
| 2008/0242355 | A1 | 10/2008 | Yu |
| 2009/0076650 | A1 | 3/2009 | Faes |
| 2009/0094126 | A1 | 4/2009 | Killian et al. |
| 2009/0283591 | A1 | 11/2009 | Silbernagl |
| 2011/0016054 | A1 | 1/2011 | Dixon et al. |
| 2011/0087630 | A1 | 4/2011 | Harada et al. |
| 2011/0246319 | A1 | 10/2011 | Chan et al. |
| 2011/0250866 | A1 | 10/2011 | Fisher |
| 2012/0296710 | A1 | 11/2012 | Dixon et al. |
| 2013/0275245 | A1 | 10/2013 | Dixon et al. |
| 2013/0339243 | A1 | 12/2013 | Dixon et al. |

FOREIGN PATENT DOCUMENTS

| | | |
|---|---|---|
| JP | 2003058919 A | 2/2003 |
| JP | 2004048193 A | 2/2004 |
| KR | 1020000036786 A | 7/2000 |
| KR | 1020040005989 A | 1/2004 |
| KR | 1020050005738 A | 1/2005 |
| WO | 0016255 A1 | 3/2000 |
| WO | 2006124808 A2 | 11/2006 |

OTHER PUBLICATIONS

MYBI [online] NATIONMASTER.COM 2003-2005. Retrieved from the Internet: <URL:http://www.statemaster.com/encyclopedia/Mybi>, 2 pages.

U.S. Appl. No. 11/681,174, "Final Office Action", Oct. 19, 2009, 22 pages.

U.S. Appl. No. 11/681,174, "Final Office Action", Mar. 14, 2011, 9 pages.

U.S. Appl. No. 11/681,174, "Non-Final Office Action", Aug. 13, 2014, 14 pages.

U.S. Appl. No. 11/681,174, "Non-Final Office Action", Nov. 21, 2008, 22 pages.

U.S. Appl. No. 11/681,174, "Non-Final Office Action", May 14, 2010, 23 pages.

U.S. Appl. No. 11/681,175, "Final Office Action", Jun. 29, 2010, 13 Pages.

U.S. Appl. No. 11/681,175, "Non-Final Office Action", Dec. 24. 2009, 13 Pages.

U.S. Appl. No. 11/681,175, "Non-Final Office Action", Aug. 19, 2011, 14 Pages.

U.S. Appl. No. 11/681,175, "Non-Final Office Action", Jan. 14, 2011, 15 Pages.

U.S. Appl. No. 11/681,175, "Notice of Allowance", Mar. 27, 2012, 8 pages.

U.S. Appl. No. 11/681,175, "Notice of Allowance", Jan. 28, 2013, 9 pages.

U.S. Appl. No. 11/681,176, "Final Office Action", Apr. 19, 2011, 13 pages.

U.S. Appl. No. 11/681,176, "Final Office Action", Mar. 7, 2012, 16 pages.

U.S. Appl. No. 11/681,176, "Non-Final Office Action", Oct. 13, 2010, 13 pages.

(56) References Cited

OTHER PUBLICATIONS

U.S. Appl. No. 11/681,176, "Non-Final Office Action", Nov. 2, 2011, 14 pages.
U.S. Appl. No. 11/681,176, "Notice of Allowability", Jan. 18, 2013, 15 pages.
U.S. Appl. No. 11/681,176, "Notice of Allowability", Jan. 9, 2013, 15 pages.
U.S. Appl. No. 11/681,176, "Notice of Allowance", Nov. 27, 2012, 18 pages.
U.S. Appl. No. 11/681,179, "Final Office Action", Jul. 21, 2010, 20 pages.
U.S. Appl. No. 11/681,179, "Non-Final Office Action", Jun. 4, 2009, 15 pages.
U.S. Appl. No. 11/681,179, "Non-Final Office Action", May 5, 2011, 20 pages.
U.S. Appl. No. 11/681,179, "Notice of Allowance", Jan. 6, 2012, 9 pages.
U.S. Appl. No. 11/681,179, "Supplemental Notice of Allowance", May 3, 2012, 7 pages.
U.S. Appl. No. 11/713,307, "Non-Final Office Action", Sep. 9, 2009, 17 Pages.
U.S. Appl. No. 11/713,307, "Notice of Allowance", Jun. 1, 2010, 10 Pages.
U.S. Appl. No. 12/883,919, "Non-Final Office Action", Jun. 5, 2012, 17 pages.
U.S. Appl. No. 12/883,919, "Notice of Allowance", Nov. 29, 2012, 16 pages.
U.S. Appl. No. 13/564,625, "Final Office Action", Jul. 25, 2013, 13 pages.
U.S. Appl. No. 13/564,625, "Non-Final Office Action", Dec. 19, 2012, 13 pages.
U.S. Appl. No. 13/564,625, "Non-Final Office Action", Mar. 24, 2014, 13 pages.
U.S. Appl. No. 13/564,625, "Notice of Allowance", Oct. 31, 2014, 8 Pages.
U.S. Appl. No. 13/776,421, "Final Office Action", Mar. 6, 2014, 12 pages.
U.S. Appl. No. 13/776,421, "Non-Final Office Action", Jun. 12, 2014, 10 pages.
U.S. Appl. No. 13/776,421, "Non-Final office action", Nov. 18, 2013, 12 pages.
U.S. Appl. No. 13/776,421, "Non-Final Office Action", Jan. 7, 2015, 5 pages.
U.S. Appl. No. 13/872,637, "Non Final Office Action", Oct. 10, 2013, 6 pages.
U.S. Appl. No. 13/872,637, "Notice of Allowance", Dec. 16, 2013, 11 pages.
U.S. Appl. No. 13/564,625, "Non-Final Office Action", Jul. 25, 2013, 13 pages.
AU2007345583, "First Examiner Report", Nov. 17, 2011, 2 pages.
KR10-2008-7017975, "Office Action", Nov. 13, 2013, 8 pages.
KR10-2009-7017975, "Notice of Allowance", Jan. 14, 2015, 5 pages.
KR10-2009-7017975, "Office Action", Sep. 10, 2014, 3 pages.
KR10-2009-7017980, "Office Action", Nov. 30, 2013, 3 pages.
KR10-2009-7017982, "Office Action", Sep. 10, 2014, 6 pages.
KR10-2009-7017982, "Office Action", Feb. 12, 2015, 7 pages.
PCT/US2007/082842, "International Preliminary Report on Patentability", Aug. 4, 2009, 5 pages.
PCT/US2007/082842, "International Search Report and Written Opinion", Apr. 1, 2008, 5 pages.
PCT/US2007/082852 "International Search Report and Written Opinion", Apr. 18, 2008, 6 pages.
PCT/US2007/082887, "International Search Report and Written Opinion", May 7, 2008, 7 pages.
PCT/US2007/082898, "International Preliminary Report on Patentability", Aug. 4, 2009, 6 pages.
PCT/US2007/082898, "International Search Report and Written Opinion", May 7, 2008, 6 pages.
PCT/US2007/082903, "International Preliminary Report on Patentability", Aug. 4, 2009, 6 pages.
PCT/US2007/082903, "International Search Report and Written Opinion", Aug. 20, 2008, 6 pages.
Office Action mailed Jun. 12, 2015 in U.S. Appl. No. 11/681,174, 21 pages.

* cited by examiner

PROCESSING TRANSACTIONS OF DIFFERENT PAYMENT DEVICES OF THE SAME ISSUER ACCOUNT

This application is a continuation of U.S. application Ser. No. 13/564,625, filed Aug. 1, 2012, titled "Processing Transactions of Different Payment Devices of the Same Issuer Account," which application is a continuation of U.S. application Ser. No. 11/681,179, filed Mar. 1, 2007, titled "Processing Transactions of Different Payment Devices of the Same Issuer Account," which application claims the benefit of U.S. Provisional Application No. 60/887,307, filed Jan. 30, 2007, titled "Contactless Bank Card Transit Payment," each of the contents of which are hereby incorporated in their entirety by reference.

BACKGROUND

The present invention relates generally to financial transactions, particularly to customers requesting financial transactions with merchants, and more particularly to financial transactions conducted with a financial institution portable payment device issued by a financial institution, such as a credit card, that may be used both in a retail transaction and in a transit fare transaction.

Portable payment devices can take many forms and are used in a great variety of financial transactions. The portable payment devices can comprise, for example, smart cards, payment tokens, credit cards, debit cards, stored value cards, pre-paid cards contactless cards, cellular telephones, Personal Digital Assistant (PDA) devices, key fobs, or smart cards. The financial transactions can involve, for example, retail purchases, transit fares, access to venue fares, etc. In all such transactions, the portable payment device users (consumers) are concerned with convenience and the merchants with whom they deal are concerned with ease of transacting with their customer-consumers.

Preferably, financial institution portable payment devices issued by a financial institution (FIPPD) are used in an on-line fashion (e.g., a point of service that is connected to a payment processing system during a transaction). The information from the FIPPD may be transmitted on-line to an issuer during a retail payment transaction for purposes of authorizing the use of the FIPPD for that transaction. The issuer may review parameters of the transaction such as transaction amount, credit history, card authenticity, and other factors when determining whether or not to authorize or decline the transaction.

However, some merchant transactions are not on-line such that FIPPD authentication and verification schemes are not readily accommodated. For example, the ability to go on-line in a transit environment such as a subway or bus system, or a venue access environment such as a stadium or concert hall, may be problematic because of the lack of real time communication and lack of network systems for such environments. This is due in part to the need in such environments to process a transaction within about 300 ms, a transit system industry standard, and thereby allow 30 to 45 patrons per minute access into a facility of the transit system such as a subway or a bus. Moreover, a bus on an over-the-road bus route may not have wireless or other communication systems to allow any real-time dialogue with any other systems outside of the bus, such as for on-line fare assessment or on-line admission ticket/voucher/card authorization. Therefore this absence of network connectivity in a transit environment presents a difficulty whenever an on-line authentication of the consumer's means of access, such as an admission ticket, voucher, or access card, is necessary in order to determine whether, for instance, the consumer is entitled to access and has sufficient funds to cover the cost of the desired transaction (fare for riding on the transit system).

Moreover, in a transit environment, the value of the transit fare may not be known at the time of requested access. A fare calculation may depend upon the actual travel distance, direction of travel, station entry and exit locations, mode of travel (subway, bus, water taxi), consumer category (student, senior), and/or times of use (peak, off-peak). Such parameters may be unknown prior to rendering the service. As such, the transit fare payment and collection process cannot be performed effectively using a conventional on-line authentication and approval process.

Traditionally, transit fare calculation and collection have occurred in a closed system. In a closed system, the transit company may issue its own transit portable payment device, such as a read/write smart card, wherein the transit portable payment device carries the necessary credentials and data to allow completion of a transaction at the fare device itself (turnstile, fare box, or other Point of Service). In this case, there is no additional processing required for fare determination at the time of the transaction outside of the interaction between the card and the fare device. Rather, the card is authenticated and read by the fare device, logic is performed by the fare device to apply transit system fare policy, and the card is updated (rewritten) to finalize the transaction details including a deduction of any stored value for the cost of fare. The fare device may additionally query a white list, a positive list, a hot list, a negative list and/or a black list utilizing the card number, for example, to determine whether the transaction will be completed and the cardholder will be allowed access into a facility of the transit system such as a subway terminal or bus passenger compartment.

The closed transit system, however, has its drawbacks. In a closed transit system, the transit portable payment device and transit readers at each station or route must be able to perform fare computations based on data stored and retrieved from a rider's access card, and subsequent card terminals/readers must be able to access data written to the rider's access card at previous stations. This requirement places a significant processing burden on the transit system terminals and/or fare processing systems and increases the cost of implementing the infrastructure for such systems. As fare rates and other relevant information generally change over time, this also increases the demands placed upon such systems for maintenance of accuracy.

Moreover, one transit portable payment device may not be compatible with all of the fare devices within a rider's travel plan. This can become a significant problem if a consumer wishes to utilize more than one transit system during a day's commute, such as by using multiple transit agencies or venues within a single geographical area that provide ridership both in and among different jurisdictions, cities or locations.

The present transit environment presents several challenges, including:
  A common necessity that there can be only one transit portable payment device for each transit agency or group of cooperating agencies that cannot be used for other such agencies or groups;
  The desire to accommodate transit system user's transaction speed expectations while minimizing risk to the transit agency for collecting payment for services rendered; and
  When a portable payment device is 'read-only,' not having write capabilities at the Point of Service, the Portable Payment devices cannot store the rider's transit chronology data—thus making the rider's fare calculations somewhat difficult with such devices. With such off-line transactions, a list (i.e., a white list of eligible cards or a negative list of rejected cards based on the unique card number) stored at each transit fare device is the primary mechanism to deter fraud. This is sub-optimal since the negative list would presumably grow unbounded as more FIPPD are issued.

In addition to the transit system rider's desire for a fast transaction speed when accessing a transit system facility, there are security and other risks associated with the use of a FIPPD that is designed for on-line authorization when it is otherwise used in an off-line transaction. These risks include, but are not limited to:

Authentication/Fraud: the lack of FIPPD authentication in real time creates a high potential for fraud through counterfeiting techniques;

Fare Cost Calculation: where the cost of a transit transaction is dependent upon the immediate rider history for the card (entry/exit/length of travel, transfers, etc.), the rider's transit fare cannot be calculated at each gate or fare box because the rider's immediate history of travel cannot be stored, written or resident on conventional FIPPDs.;

Data Security/Storage: protection of consumer data in a transit fare system may prove difficult. Tracking data in the form of a primary account number (PAN) for a FIPPD would require the transit system to collect and store this data securely, which is not something transit fare systems commonly do presently. If implemented, this requirement presents added cost and security concerns to both the transit system and its riders; and What is needed in the art is the payment and collection of transactions utilizing a FIDDP device within the above environments, including access fares to transit systems and venues, that overcome the challenges and disadvantages of the prior art.

SUMMARY

A payment transaction can be conducted in a combined off-line/on-line scheme utilizing a financial institution portable payment device (FIPPD). During a consumer's transaction with a merchant for a good or service, information from the FIPPD can be read at a point of service (POS) terminal. The transaction information can be sent off-line to a central server for processing while the consumer with the FIPPD receives the good or service associated with the transaction. After the consumer has received the good or service, the transaction value can be calculated at the central server based on predetermined rules and/or policies. Once calculated, the central server may conduct an on-line transmission of the calculated transaction value to a payment processing system, such as a credit card payment system, so that the merchant can collect the calculated transaction value from one or more members of the payment processing system.

In one implementation, data is read from a storage region of a payment device for each of a plurality of consumers seeking to conduct a transaction with a merchant for a good or service. The data read may include an account assigned by the issuer of the payment device and issuer discretionary data. A unique identifier is assigned to the static data read from the storage region. The transaction is then processed to attribute the transaction to the account and to the unique identifier within the corresponding account.

In another implementation, access transaction application data is read from a storage region of a payment device for each of a plurality of riders seeking to gain access into a transit facility. The access transaction application data read may have predetermined data field configuration for use with a point of service reader of the transit agency. The access transaction application data read may include an account assigned by the issuer of the payment device and issuer discretionary data. A unique identifier is assigned to the static access transaction application data read from the storage region. The transaction is then processed to attribute the transaction to the account and to the unique identifier within the corresponding account.

In another embodiment, access transaction application data is read from a storage region of a payment device for each of a plurality of riders seeking to gain access into a transit facility. The access transaction application data read may conform to a magnetic stripe data (MSD) configuration in a track one/track two format. The access transaction application data read may include a statically stored Primary Account Number (PAN) determined by the issuer of the payment device and issuer discretionary data. A unique identifier is assigned to the static access transaction application data read from the storage region. The transaction is then processed to attribute the transaction to the account and to the unique identifier within the corresponding account.

BRIEF DESCRIPTION OF THE DRAWINGS

The subject invention will be described in the context of the appended drawing figures, where the same numbers are used throughout the disclosure and figures to reference like components and features.

DETAILED DESCRIPTION OF THE INVENTION

Figure 1:
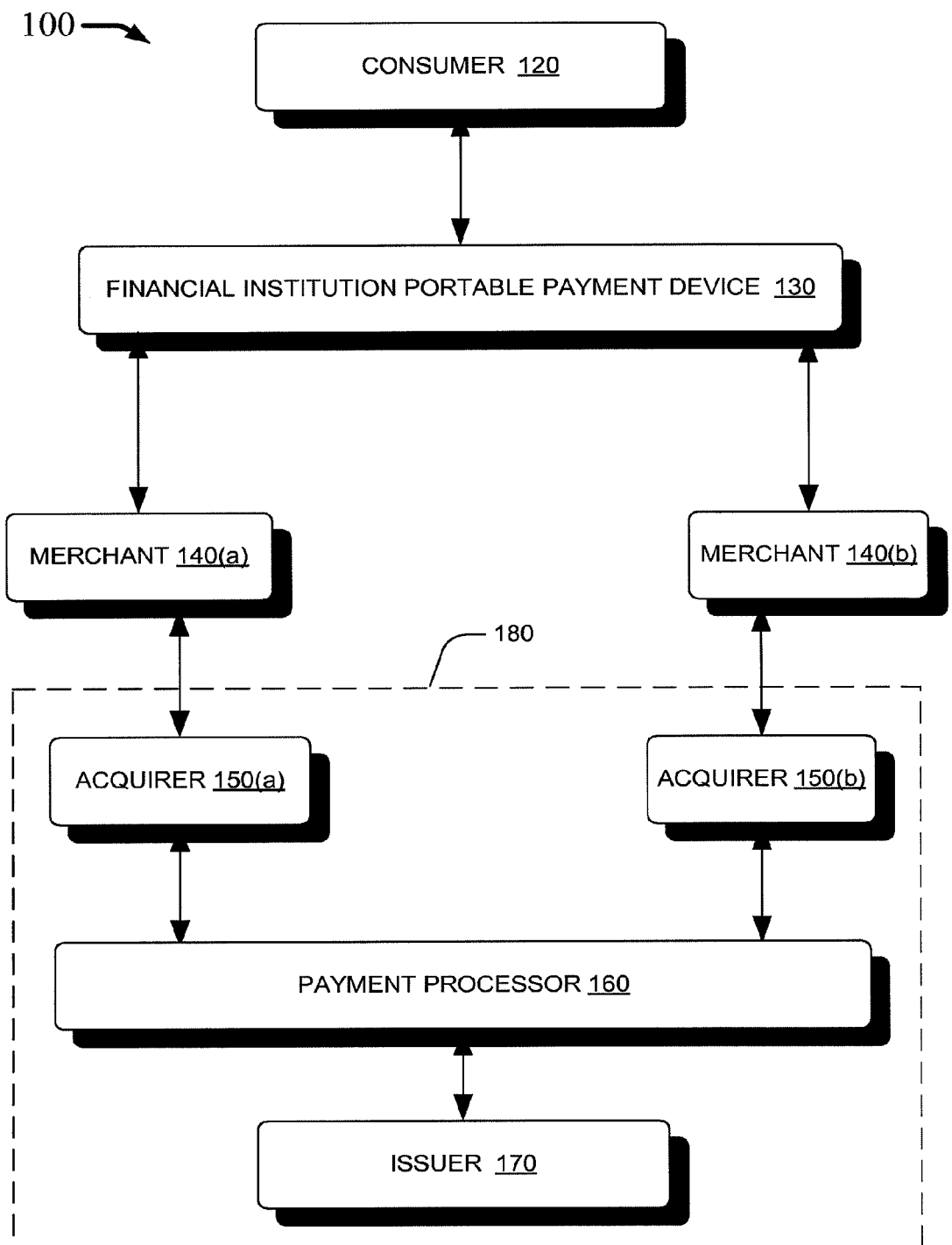
FIG. 1 is a block level diagram illustrating an exemplary payment processing system.

Implementations facilitate the payment and collection of transactions using a financial institution portable payment device (FIPPD) such as a contactless card or a smart chip embedded in a mobile device such as a cellular telephone. The transaction value of each transaction may not be known at the time that a consumer in the transaction receives from a merchant one or more goods or services associated with the transaction. Mechanisms are provided to curb fraud through the use of a negative list system (e.g., a list of invalid account numbers) sometimes referred to as "black list" or "hot list", and/or through the use of a white or "positive" list system (e.g.; a list of valid account numbers).

As used herein, a FIPPD is intended to be broadly understood as being a portable payment device associated with an account within a payment system. The account may be a credit account, a debit account, a stored value account (e.g., a pre-paid account, an account accessible with a gift card, an account accessible with a reloadable card). As such, the FIPPD may be a (handheld) device such a cellular telephone, a MP3 player, a Personal Digital Assistant (PDA), a key fob, a mini-card, a keychain device (such as the Speedpass™ commercially available from Exxon-Mobil Corp.), a proximity contactless payment device such as one that complies with the International Organization for Standardization (ISO) 14443, a substrate bearing an optically scannable data region, a smart card, or integral and/or accessorized elements rendering the same functional equivalent of and to a contactless bank card associated with a payment system. A contactless payment device is a device that incorporates a means of communicating with a portable payment device reader or terminal without the need for direct contact. Thus, such portable payment devices may effectively be presented in the proximity of a portable payment device reader or terminal. A smart chip is a semiconductor device that is capable of performing most, if not all, of the functions of a smart card, but may be embedded in another device. Such contactless devices typically communicate with the portable payment device reader or terminal using RF (radio-frequency) technology, wherein proximity to an antenna causes data transfer between the portable payment device and the reader or terminal.

Typically, an electronic payment transaction is authenticated if the consumer conducting the transaction is properly authorized and has sufficient funds or credit to conduct the transaction. Conversely, if there are insufficient funds or credit in the consumer's account, or if the consumer's portable payment device is reported as lost or stolen, then an electronic payment transaction may not be authorized. In the following description, an "acquirer" is typically a business entity (e.g., a commercial bank) that has a business relationship with a particular merchant. An "issuer" is typically a business entity (e.g., a bank) which issues a portable payment device such as a credit, debit, or stored value card to a consumer. Some entities may perform both issuer and acquirer functions.

In standard operation, an issuer validation (e.g., authorization) request message is created during a consumer purchase of a good or service at a Point Of Service (POS) using a portable payment device. The issuer validation request message can be sent from the POS terminal located at a merchant to the merchant's acquirer, to a payment processing system, and then to an issuer. An "issuer validation request message" can include a request for issuer validation to conduct an electronic payment transaction. It may include one or more of an account holder's payment account number, currency code, sale amount, merchant transaction stamp, acceptor city, acceptor state/country, etc. An issuer validation request message may be protected using a secure encryption method (e.g., 128-bit SSL or equivalent) in order to prevent data from being compromised.

Referring to FIG. 1, one implementation of a payment system 100 compatible with a FIPPD is illustrated. The payment system 100 includes, a plurality of merchants 140 associated with one or more acquirers 150, and issuers 170. Each merchant 140 may have one or more merchant locations 140(a), 140(b) with acquirers 150(a) and 150(b) associated with those merchant locations, where 'a' can be a value from 1 to 'A' and 'b' can be a value from 1 to 'B'. The different merchant locations 140(a), 140(b) may be affiliated with a single merchant. A consumer 120 may purchase a good or service at the merchant locations 140(a), 140(b) using a FIPPD 130. The acquirers 150(a), 150(b) can communicate with an issuer 170 via a payment processor 160.

The FIPPD 130 may be in many suitable forms. As stated previously, the FIPPD 130 can be a mobile device that incorporates a contactless element such as a chip for storing payment data (e.g., a BIN number, account number, etc.) and a wireless data transfer (e.g., transmission) element such as an antenna, a light emitting diode, a laser, a near field communication component, etc. The FIPPD 130 may also be used to perform debit functions (e.g., a debit card), credit functions (e.g., a credit card), or stored value functions (e.g., a stored value card).

The payment processor 160 may include data processing subsystems, networks, and other means of implementing operations used to support and deliver issuer validation services, exception file services, and clearing and settlement services for payment transactions. The acquirer 150, payment processor 160, and the issuer 170 make up a payment processing system 180.

The payment processor 160 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processor 160 may use any suitable wired or wireless network, including the Internet.

The merchant 140 typically has a point of sale (POS) terminal (not shown) that can interact with the FIPPD 130. Any suitable point of sale terminal may be used, including device (e.g., card) readers. The device readers may include any suitable contact or contactless mode of operation. For example, exemplary card readers can include RF (radio frequency) antennas, magnetic stripe readers, etc., to interact with the FIPPD 130.

As noted, a desirable element of the standard electronic payment transaction system is the entity responsible for the account management functions involved in the transaction. Such an entity may be responsible for ensuring that a user is authorized to conduct the transaction (via an on-line issuer validation by issuer 170 such as issuer 170 authentication), confirm the identity of a party to a transaction (via receipt of a personal identification number), confirm a sufficient balance or credit line to permit a purchase, and reconcile the amount of purchase with the user's account (via entering a record of the transaction amount, date, etc.). Also, such an entity may perform certain transit related services in addition to the standard transaction services.

For example, the payment transaction processing entity may be responsible for communicating with one or more transit agency computer systems to provide authentication data (by generating and/or distributing keys) for control of access to transit systems, process data obtained from a transit user's mobile device to associate transit system user identification data with an account used to pay for the transit expenses, generate billing records for transit activities, etc. Note that a trusted third party may also perform some or all of these functions, and in that manner act as a clearinghouse for access control data and/or transit activity data processing.

Figure 2:
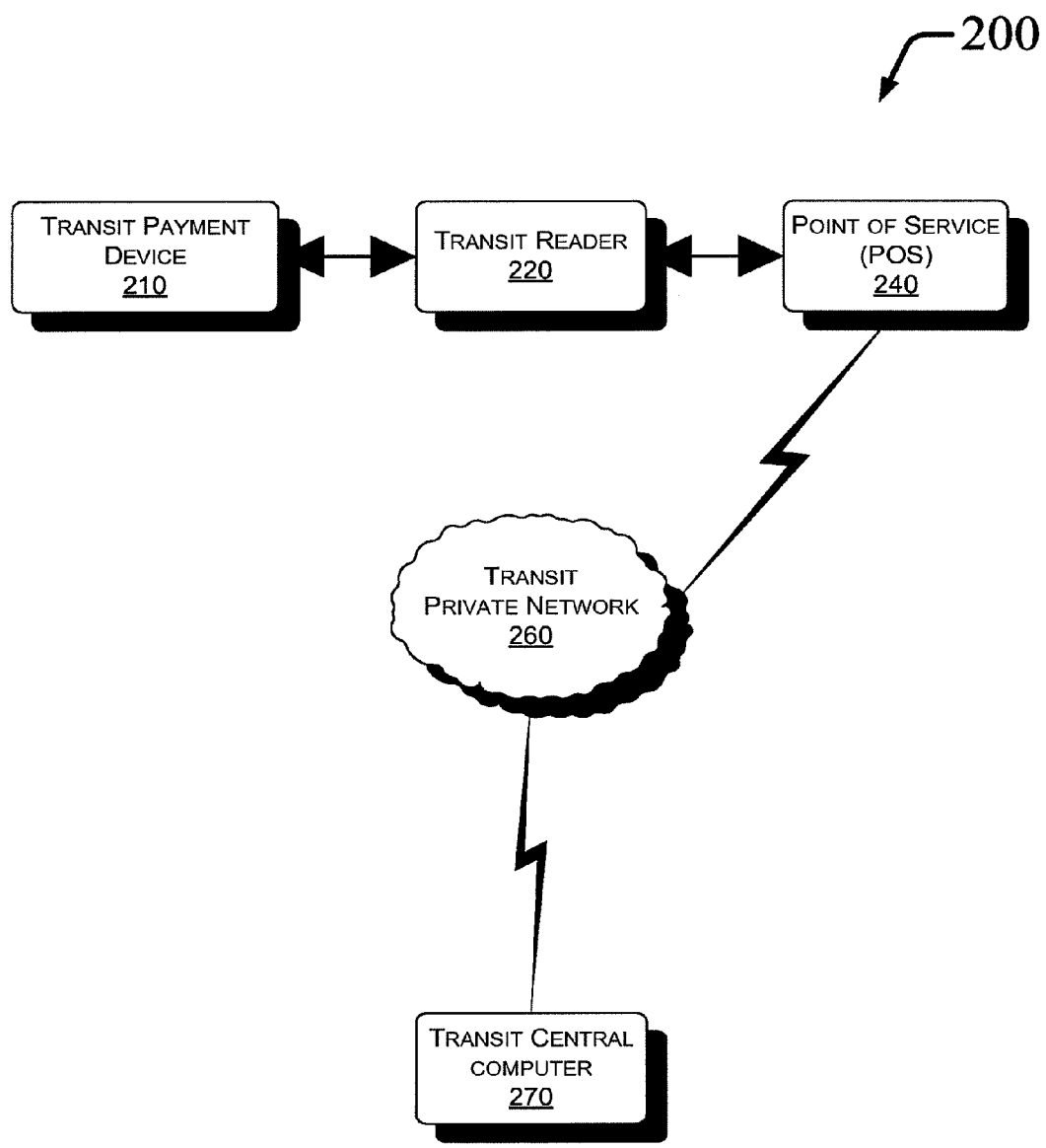
FIG. 2 is a block level diagram illustrating an exemplary closed transit processing system.

Referring now to FIG. 2, transit fare collection is typically accomplished in a closed transit processing system 200—the transit portable payment device 210 being issued by the transit system and the fare being calculated at the transit POS 240.

The transit POS 240 may be a fare box or a turnstile with a transit system reader 220, such as a contactless card reader. The transit POS 240 collects and stores data such as the card identification number, card transaction history, card validity information, etc. The transit POS 240 and the transit portable payment device 210 validate each other, typically utilizing encryption algorithms and keys. The transit POS 240 then requests the data from the transit portable payment device 210. The transit reader 220 and transit POS 240 process the data from the transit reader 220 and apply the fare policy rules for the transit agency. Processing of the fare rules will result in a determination of a fare value, followed by the decreasing from the transit portable payment device 210 of value or number of rides, or application of a pass (like a monthly pass.) The transit portable payment device 210 is updated through writing information back to the transit portable payment device 210 as necessary to document the transaction on the transit portable payment device 210.

If one transaction has an impact on the cost of the next transaction, as in the case of a discounted transfer when the patron transfers to the next leg of the journey, the appropriate transit portable payment device 210 history is available at the time of the transfer transaction. The information stored on the transit portable payment device 210 is available to make determination of the cost of the fare at the moment of the transaction. There is no need to query any other computers or servers to complete the transaction at the fare device and the rider is allowed to enter the access facility.

Figure 3:
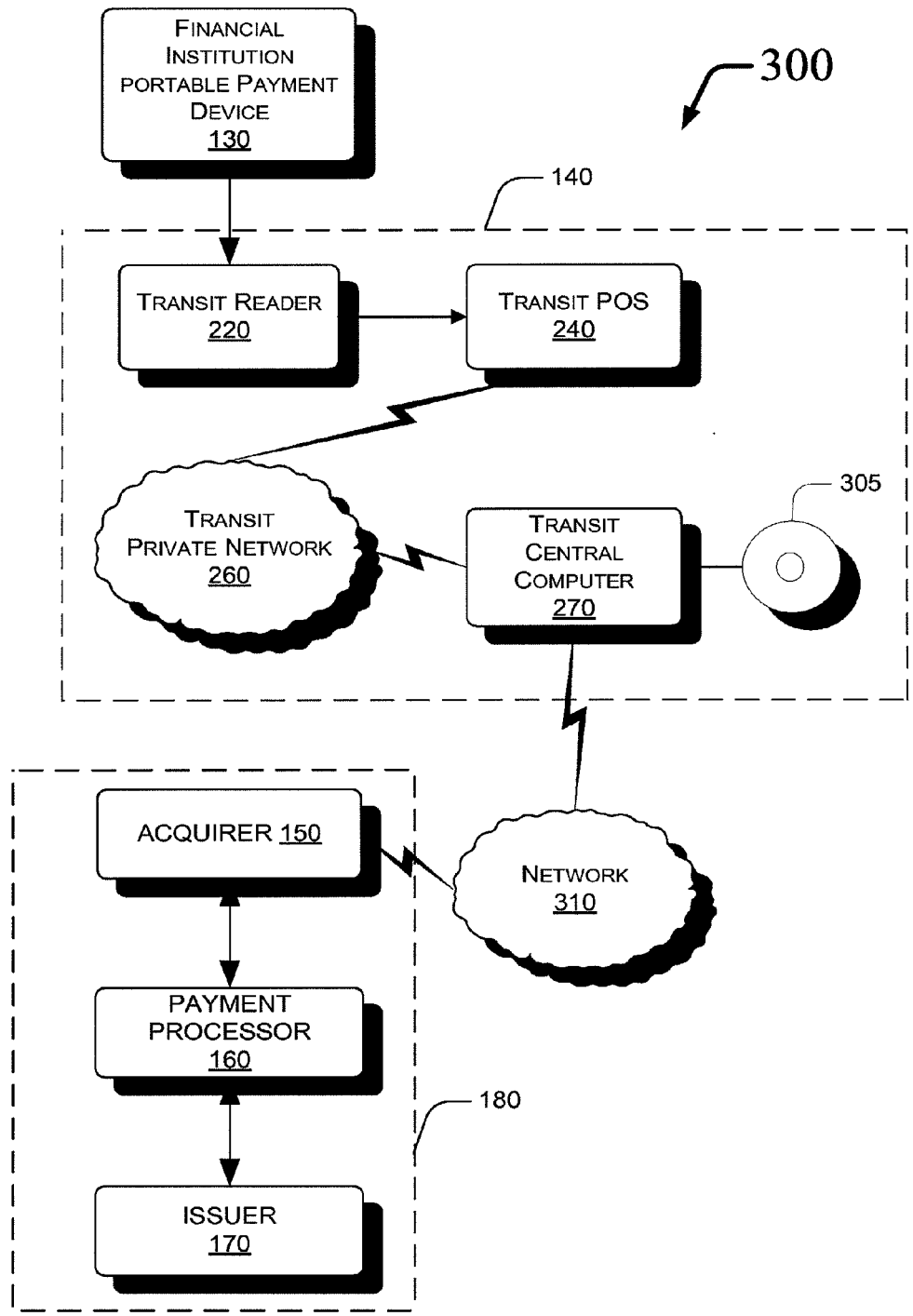
FIG. 3 is a block level diagram illustrating an exemplary open transit processing system which is compatible with the payment processing system seen in FIG. 1.

After the transaction is complete, the fare transaction information is typically transferred to transit central computer 270 via the transit private network 260 for purposes of accounting, reporting, and fraud determination. Transit portable payment device 210 is uniquely identified by a transit account number, and is tracked for out of balance values, velocity, or use-rules. If the fraud rules are broken and the transit portable contactless device 210 is determined to have associated fraud, the transit portable payment device 210 number may be placed on a negative or positive list that may be kept in a storage that is accessible to the transit central computer, such as is seen in FIG. 3 at reference number 305 and described below. The hot list may be sent to each transit POS 240 for use as a validation component at the time of the transaction. For example, if the transit portable payment device 210 identification number is found on the hot list, the transit portable payment device 210 may be denied for entry into the transit system.

Referring now to FIG. 3, a FIPPD 130 can be used in a scheme to conduct a transaction within an open access system 300. Implementation of an access fare application does not allow the opportunity for the payment transaction to go on-line to the issuer 170 for an issuer validation (e.g., authorization) at the time of the transaction as would occur with the merchant 140, such as a retail merchant. This is due in part to the need to process a transaction in less than a second, typically within about 300 ms—a transit system industry standard, to allow 30 to 45 patrons per minute into the transit facility (hereafter referred to as the "access period"). The ability to go on-line in the transit environment may also be problematic because of the lack of real time communication and network systems. For example, buses are on the road and may not have wireless or other communication systems to allow real-time dialogue with any other systems outside of the bus. Consequently, one implementation combines a scheme of processes to conduct a fare transaction, such as has been illustrated in FIG. 3.

For example, a rider may present the FIPPD 130 at the transit POS having the transit reader 220. The transit reader 220 can capture from the FIPPD 130 financial institution account information, such as Magnetic Stripe Data (MSD), in an off-line mode (e.g., without communicating with the payment processing system 180). The transit reader 220 may read all of a track data, or just part of the track data such as a primary account number (PAN) associated with the FIPPD 130. The track data, along with other transaction information, such as the time of day and the location of the transit POS 240, can be transmitted to the transit central computer 270 via the transit private network 260. At this point, however, the fare value may not be known. Nevertheless, the consumer is given access to the transit facility.

The transaction information can be stored and analyzed at the transit central computer 320. The transit central computer 320 may have a database containing transit transaction history for all riders that use the transit system. The transit transaction history can be updated with each FIPPD 130 usage at the transit POS 240 or it may be updated on a batch basis.

The transit transaction history may be accessed to calculate the value of a fare off-line. For example, a set of the transit transaction history within the database can be accessed based on the PAN read from the FIPPD 130 at each transit event (e.g., entry, transfer, or exit) using the FIPPD 130; the transit transaction history may then be put into a chronological order of transit events; and the transit fare can be derived using the chronology of transit events on the basis of predetermined transit agency rules and policies.

Once the fare value is derived, the transaction can be processed in communication with the payment processing system 180 as would a standard on-line retail transaction with the merchant 140. The fare value can be transmitted to the payment processing system 180 via the on-line network 310. Once transmitted, the fare value can be authorized, cleared and settled—as described for the payment system 100—with the merchant 140.

Figure 4:
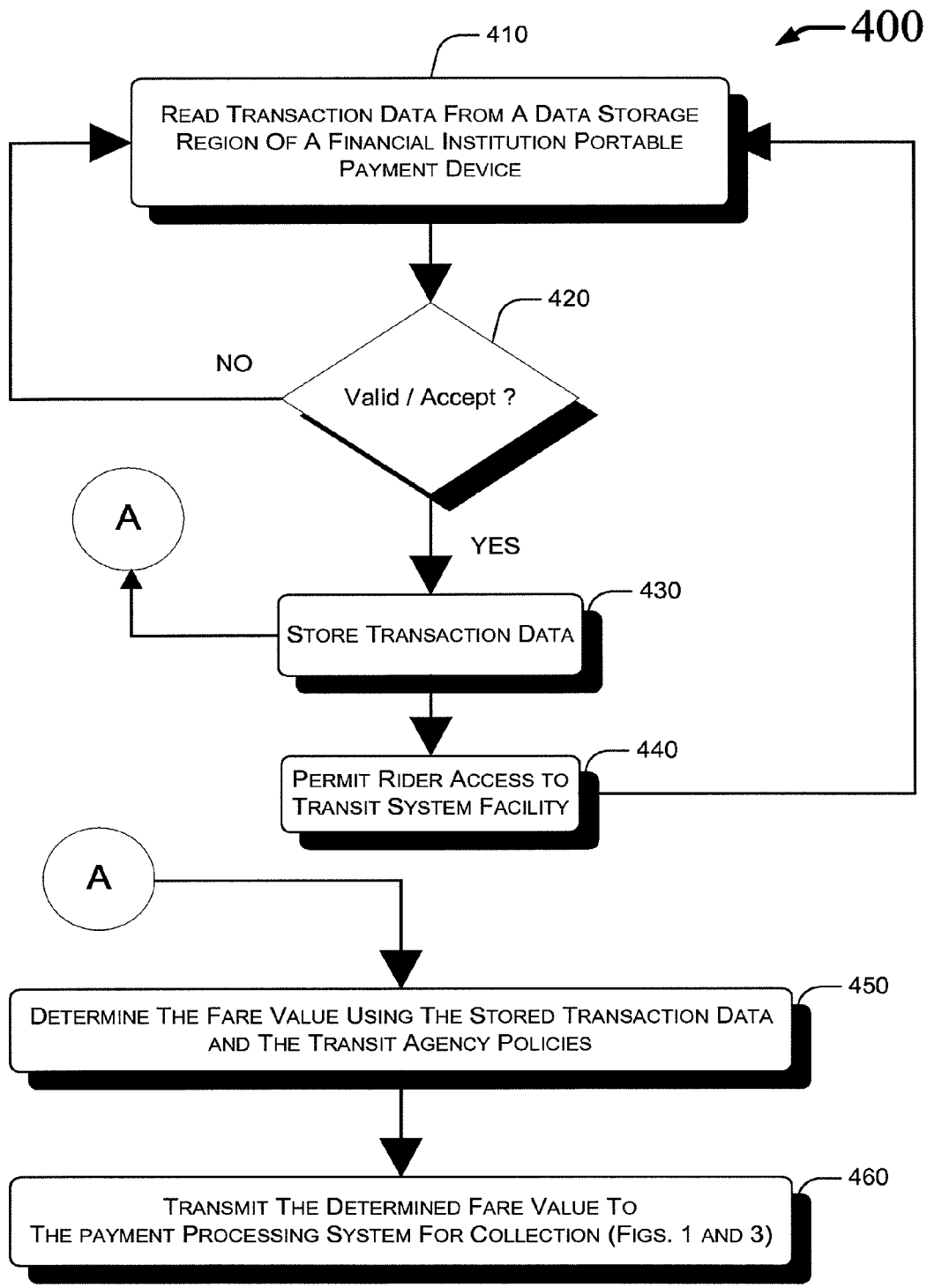
FIG. 4 is a flow chart illustrating an exemplary process through which a financial institution portable payment device can be used in the environment of the open transit processing system illustrated in FIG. 3.

Referring to FIG. 4, a flow chart is used to illustrate an exemplary process 400 through which the FIPPD 130 can be used in the open transit system 300. Process 400 begins at step 402 where data from the data storage region of the FIPPD 130 associated with an account within the payment system 100 is read. The data can include all of the track data or subcomponent thereof. For example, the data can include an identification for the FIPPD associated with the account such as the PAN. The data can be read by the transit reader 220 such as a contactless reader reading a contactless payment card that has been issued by an issuer in a payment processing system. The transaction data can include the data read at the transit reader 220 along with other transaction information such as the date, the time of day, a merchant identification code, the location of the transit POS 240, etc.

At step 420, optional validation request can be conducted at the transit POS 240 including rudimentary checks on the status of the FIPPD 130 or a variations of on-line issuer validation (e.g., authorization) with the payment processing system 180. For example, a transit validation can be requested, for instance, by examining the expiration date of the FIPPD 130 at the transit POS 240. Also, a Modulus 10 analysis (via the Luhn algorithm) can be done at the transit POS 240 wherein a checksum formula is used to validate an identification number such as the PAN.

Alternatively, or in combination, the validation step 420 may include a check against the transit agency's white list or black list maintained either at the transit POS 240 or at the transit central computer 270 to determine if the rider should be permitted access into the transit facility. The white list may be a list of data such as a hashed PAN associated with an eligible account that can be used to gain access to the transit facility. Similarly, the black list, may be a list of data associated with an ineligible account, such a hashed signature that cannot be used to gain access to the transit facility. Therefore, the white list or black list may consist of identifiers for portable payment devices, such as the PAN associated with the FIPPD 130 or a proxy thereof. The transit agency may place a portable payment device on such a list (e.g., white or black) based on various parameters. For example, the portable payment device may have been reported stolen by a consumer, the portable payment device may have been a stored value card that has exhausted its value, or the portable payment device may have been used in a repeated fashion over a course of a day such that fraud may be suspected. Stated otherwise, the "velocity" with which the portable payment device is detected as having been used may indicate that fraud is being used to gain access to a transit facility; a transit agency may have a host of policies and rules that, when transgressed, place a portable payment device on the negative list. Each such list may be kept in the database 305 in communication with transit central computer 270 or at the transit POS 240.

The transit agency may also place a consumer device on a white list or black list based on a transmission originating from the payment processing system 180, such as a response to an issuer validation request. For example, the transmission may have included a notification from the issuer 170 that there has been a declined transaction involving the FIPPD 130 in the past or that the payment processing system's 180 risk assessment on the FIPPD 130, the transit system may use compared to the risk assessment to a transit toleration threshold for risk such that the transit agency may wish to place the FIPPD 130 on the negative list if the threshold is transgressed. Other responses to the issuer validation request may be a balance check response, a credit score response, an authorization response, or a combination thereof.

The white list or black list can be hosted at the transit POS 240 or at the database 305 in communication with the transit central computer 270, while still being in communication with the transit POS 240. When the list is hosted at the database 305, the white list or black list can be updated without having to make changes at each transit POS 240. The transit central computer 270 need not be a single computer. Rather, the transit central computer 270 may be a network of computers such as a network with nodes for a set of transit readers 220. The nodes may be connected to each other, either laterally and/or hierarchically.

At step 430, the transaction data can be transmitted to the transit central computer 270 for storage and analysis. The transit central computer 270 may use database 305 to contain transit transaction history for riders that use the transit system over time. The transit transaction history can include transaction information such as the date and time of a transit event, an identification of the transit POS 240, an identification of the transit agency, and at least some of the data read from the data storage region of the FIPPD 130. The transit transaction history can be updated with each FIPPD 130 event at the transit reader 220 or on a batch basis.

At step 440, the rider is given access to the transit facility. The transit facility may be a subway, a bus, a ferry, a trolley, a hover craft, a train, and other forms of transportation as are typically found within a transit system. Steps 410 to 440 may occur off-line within a short period of time such as less than about one second or over a period of time not exceeding the access period (e.g., 300 ms). Steps 410 through 440 repeat as respective riders interact with the transit POS 240.

At step 450, the transit transaction history stored in step 430 may be accessed to calculate off-line (e.g., not in real time) the value of a fare using the stored transaction data and the transit agency policies. For example, a set of the transit transactions can be accessed based on the FIPPD 130 identification information, such as the FIPPD's 130 PAN; the set of transit transactions may then be ordered chronologically by transit events (e.g., entry, transfer, or exit); and the transit fare can be derived using the chronology of transit events based on predetermined transit agency rules and policies. For example, a transit agency may charge a transit fee based on predetermined fare policies, such as a flat fee of $2.00 (U.S.) for entry into the system. Other examples of predetermined fare policies include evaluating the fare value based on: an entry into the facility of the transit system; an exit from the facility of the transit system; a distance for one entry and a corresponding exit; a transfer from one facility of the transit system to another facility of the transit system; the sequential number of each transfer in a predetermined time period; a direction of travel in the transit system; a classification of the rider corresponding to the FIPPD 130 (e.g., concessions based on age, student status, or frequent ridership); peak and off peak travel time periods; a calendar holiday travel time period; and combinations of the foregoing. Those in the art are familiar with the potential rules and policies that may apply in calculating a transit fare.

Sometimes several FIPPDs 130 may have the same PAN. For example, a husband and wife may each have their respective FIPPDs 130 linked to their joint checking account. Alternatively, several employees of the same employer may each have respective FIPPDs 130 all being associated with a single account (e.g.; PAN) within the payment processing system 180. As such, the respective fare calculations for those employees using their respective FIPPDs 130 to commute during the same time within the transit system will need to take into consideration which card is being used by each employee within the same PAN.

At step 460, the transit agency may transmit one or more calculated fare values to the payment processing system 180 for collection based on various payment models. For example, the model used by the transit agency to request payment for the calculated fare values from the payment processing system 180 may be a pay per each use model, an aggregation of multiple calculated fare values model, or a pre-paid model.

In the pay per each use model, when the transit fare is determined the fare is transmitted to the payment processing system 180 for collection. Therefore, the transit fare may be directly sent to the payment processing system 180. Alternatively, the calculated transit fare may be batched with other calculated transit fares for a plurality of FIPPDs 130 over a period of time and then sent on an intermittent basis to the payment processing system 180 for collection.

Once the transit fare is sent to the payment processing system 180 it can be processed according to typical protocol for merchants 140. For example, each $2.00 transit fare can be authorized, settled, and cleared through the payment processing system 180, the transit agency can be paid, and the consumer can receive the assessed transit fare(s) in a monthly statement corresponding to their PAN.

In the aggregation model, the transit fare involving FIPPD 130 may be accumulated based on a predetermined algorithm prior to sending the transit fare to the payment processing system 180. The cumulated transit fares may be over time, over transit value, or over quantity. For example, the transit agency may accumulate transit fares involving the FIPPD 130 that occur over a week period prior to transmitting the aggregate set of fares to the payment processing system 180. Alternatively, the transit agency may accumulate transit fare values based on a threshold value. For example, once the accumulated transit fare value reaches $20.00 (U.S. dollars), the transit agency may transmit the aggregated set of fares to the payment processing system 180. In another example, the transit agency may accumulate the transit fare values based on the quantity of transit fares—such as when a rider has completed five (5) rides involving the same FIPPD 130 where each ride had its own fare value (e.g., $4.00, $0.50, $1.00, and $5.00 U.S. dollars), and then accumulate the fares and transmit the total value thereof to the payment processing system 180.

In the stored value model, the account associated with the FIPPD 130 is accessed through the payment processing system 180 at the transit system. For example, the rider can ask the transit agent at a payment booth to deduct an amount from the rider's credit card associated with the payment processing system 180 prior to the rider going to a turnstile to seek entry into a subway of the transit system. The transit agent may then conduct an on-line transaction with the payment processing system 180 so as to charge a value against the account, for example $50.00 (U.S. dollars). The transit system can then maintain a transit account associated with the FIPPD 130, for example, such that the transit account may be maintained at the transit central computer 270. When the rider wishes to take the subway, the rider may go to the turnstile, bring up the FIPPD 130 in proximity to the transit reader 220 in a contactless reading operation. The transit POS 240, in this case the turnstile, may transmit the transit event to the transit central computer 270 via the transit private network 260. Once a plurality of such transit events are completed for the PAN associated with FIPPF 130 (such as both an entry and an exit to the subway system for the rider), the transit fare can be calculated and deducted from the transit account at the transit central computer 270. In this case, the on-line transaction to record the transit event occurs before the off-line transaction of the transit central computer 270 to collect the aggregated set of fares from the payment system 180.

The rider may set up the transit account such that the account is "topped off" at predetermined intervals—such as when the end of the month arrives or when the transit account has reached a threshold lowest value such as $5.00 (U.S. dollars), whereby a predetermined amount is charged to the account that is associated with the FIPPD 130 in the payment processing system 180 Therefore, the transit system may conduct an on-line transaction, for example for $50.00 (U.S. dollars) with the payment processing system 180 once the predetermined interval is reached.

Figure 5:
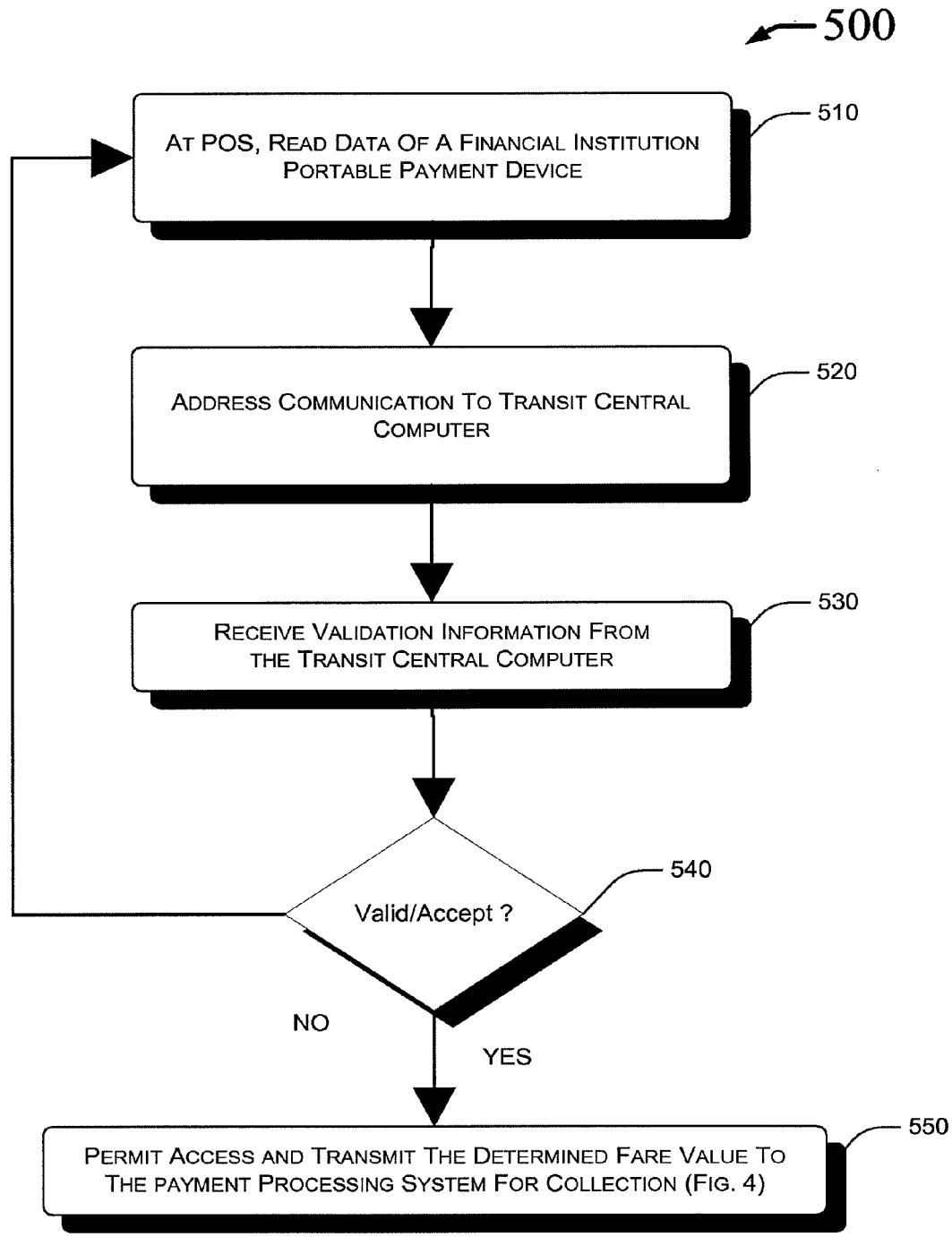
FIG. 5 is a flow chart illustrating an exemplary process of authorization a rider's use of a financial institution portable payment device at a transit system for access to a transit facility.

Referring to FIG. 5, a flow chart is used to illustrate an exemplary process 500 through which use a rider may gain access to the access facility using the FIPPD 130. At step 510, the data from the data storage region of the FIPPD 130 is read at the transit reader 220. The data can be associated with a particular account within the payment processing system 180. The data may be static or dynamic. Static data is data that does not change with each use of the FIPPD 130, such as the PAN. On the other hand, dynamic data is data that may change with the use of the FIPPD 130, such as a counter that is stored in a smart card, where each usage of the smart chart decrements or increments the counter. The data may be, for instance, the full track data or portions thereof for the FIPPD 130. Also, the data may be in a magnetic stripe data (MSD) format.

Optionally, as deterrence to fraud by theft of transit and payment system information, the data can be obscured, for example by converting it to a proxy number, by hashing the data in an algorithm executed either remotely or at the transit POS 240. Moreover, the hashed data may be truncated. The data, along with other data about the rider's request for access to the transit facility, can be stored as transit transaction data. These transit transaction data can include information such as the date, the time of the transit transaction, and/or an identification of the transit POS 240. This transit transaction data can be stored at the transit POS 240 and can be transmitted to the transit central computer 270 via the transit private network 260 for further storage, processing, or analysis.

At step 520, a communication is formed that is addressed to the transit central computer 270. This communication is transmitted over the transit private network 260. The address may be in the form of an Internet Protocol address for network transmission or other form of an address that will uniquely identify a recipient. The communication may also include the data read, a proxy thereof, and/or the full transit transaction data. One purpose of this communication can be to request a response from the transit central computer 270 as to whether or not a transit validation should be given at the transit POS 240 for the rider to use its FIPPD 130 to gain access to a facility in the transit system. The requested transit validation may be, for instance, based on a check of the read data against a white list or black list containing identifiers of eligible and ineligible accounts, respectively, that may be maintained in, for example, at the database 305 in electrical communication with the transit central computer 270. Furthermore, the requested transit validation may be based on a modulus 10 or expiration date check. For example, the transit validation process may result in a denial for access into the access facility because the FIPPD 130 has an expiration date that has passed. As stated previously, the white list or black list may be created based on the transit system policies for transit validation and/or the payment processing system's 180 responses to the issuer validation request.

In step 530, the transit POS 240 receives back the response to the requested transit validation from the transit central computer 270 in a transmission over the transit private network 260. The response may include information in various forms. For example, the information may be in a form that includes a message that the transit POS 240 (e.g.; a turnstile) should decline access to the rider seeking to enter the transit facility; the information may be in a form so as to include a message indicating that the rider is allowed access to the transit facility; the information may be in a form so as to include a message that the rider is to be assessed a discounted fare on the basis of the rider's status (e.g.; a student rider status, an elderly rider status, etc.) Also, the response to the requested transit validation may include combinations of the foregoing information in one or more other forms.

At step 540, a query is performed upon the response to the requested transit validation. If the response indicates that the rider may enter the transit facility, the process 500 moves to step 550 at which step the rider is permitted to access the transit facility. Alternatively, if the query determines that rider is declined such access, the rider can have a further option to present a different FIPPD 130 for subsequent and new consideration of the rider's access to enter the transit facility.

Alternatively, the transit validation at step 540 may be conditional. For example, if the response to the requested transit validation indicates that the FIPPD 130 is only authorized for a discounted fare based on the rider's status, such as a fare discount given to only elderly riders, then a transit agent located at the transit POS 240 may decline the rider's entry into the transit facility if the transit agent observes that rider does not meet the criteria for the discounted fare. By way of illustration, if a grandfather lends his FIPPD 130 to his grandson for use of the transit system for a day, an observation by the transit agent of the grandson may result in the transit agent denying the grandson access to the transit facility at the elderly rider status discounted fare.

Process 500 repeats steps 510 through 550 for each rider presenting the FIPPD 130 at a transit reader 220. Preferably, these steps, including the step of receiving back the response to the requested transit validation from the transit central computer 270, will occur in a short period of time, more preferably in less that about one second, and most preferably in an access period of about 300 ms.

Figure 6:
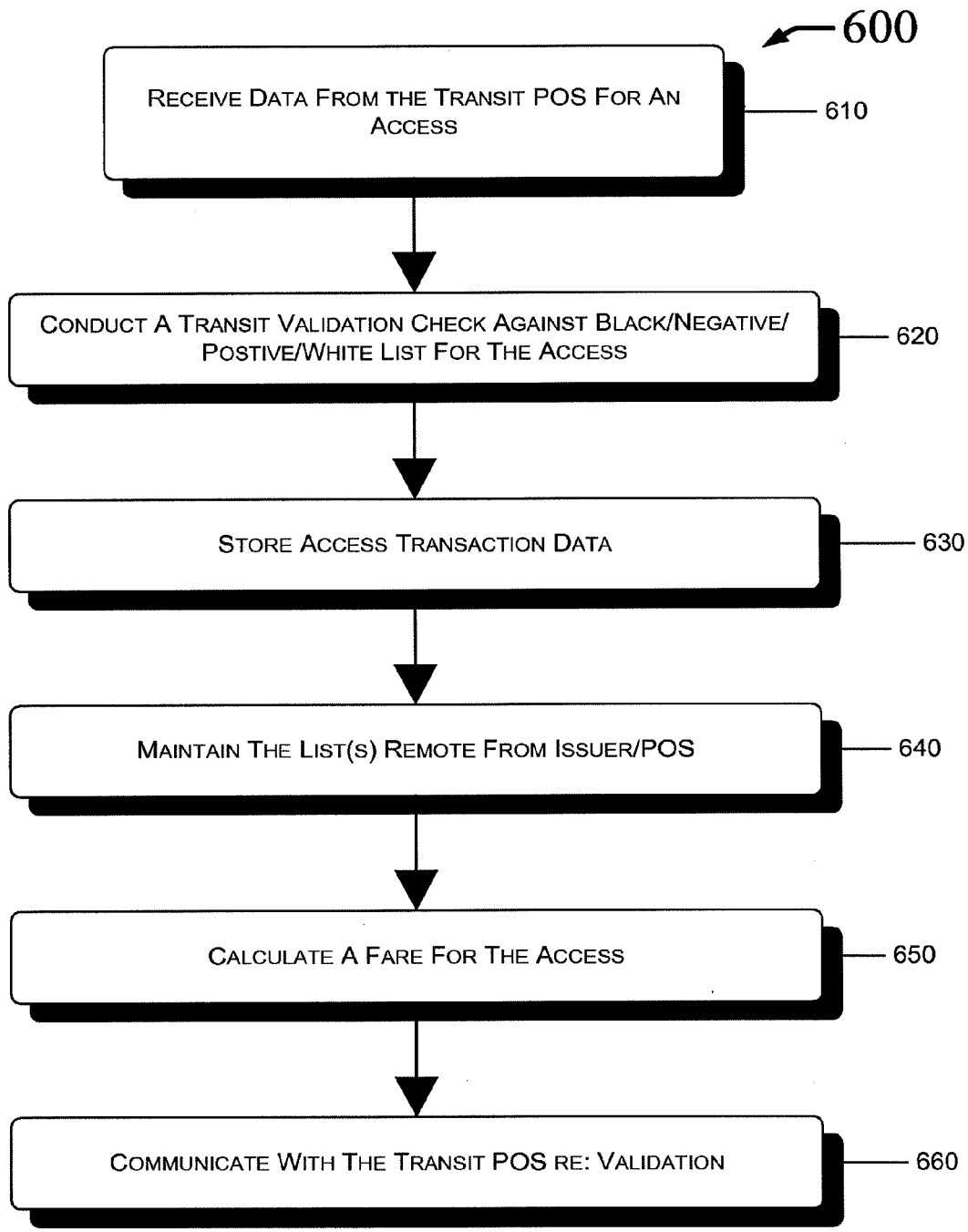
FIG. 6 is a flow chart illustrating another exemplary process for authorization a rider's use of a financial institution portable payment device at a transit system for access to a transit facility.

Referring to FIG. 6, a flow chart of a process 600 illustrates an implementation for validating a FIPPD 130 at the transit system for access by a rider to the transit facility. Process 600, for each rider, begins at step 610 where the transit reader 220 reads data from the FIPPD 130 which may include the data that will be later validated. Other data for the requested transit transaction data can also be obtained, such as the time of day and date of the access. Process 600 then moves to step 620.

At step 620, a transit validation is determined for the data (e.g., the PAN of the account within the payment process system 180 read off of the FIPPD 130) to determine if the FIPPD 130 may be used to gain access into the access system (e.g., transit system). A white list, a negative list, or a combination thereof may be used to determine such transit validation. For example, the transit central computer 270 may have a database 305 containing the status of a plurality of the FIPPDs 130 associated with respective riders. These data can be cataloged based on the track data of the FIPPD 130, signature data of the FIPPD 130, the account (e.g. the PAN), or proxies thereof.

In one implementation, an indicator associated with the FIPPD 130 can be used in order to place the FIPPD 130 on a negative list. An evaluation of the indicator, for instance, can be based on transit system policy. These indicators can be derived by the transit system internally, they can be received in a communication from the payment processing system 180, or both. For instance, the indicator can be a velocity of usage indicator corresponding to a degree of usage of the FIPPD 130 within a predetermined time period (described above), a lost card indicator, a stolen card indicator, an expiration date indicator, an exhausted stored value card balance indicator, and combinations thereof. By way of illustration, a rider offering the FIPPD 130 for access to a transit facility where the FIPPD 130 has an expiration date prior to the date of offering the FIPPD 130, may cause the transit POS 240 to set an indicator for the corresponding account such that the rider will be denied access to the transit facility. Optionally, the transit POS 240 may then send a transmission that includes the indicator and the corresponding account to the transit central computer 270 for storage in the database 305 on the negative list maintained thereat, for instance at step 630.

Also at step 630 of process 600, the transit transaction data obtained at step 610 may be stored in the database 305 and/or at the transit POS 240. The stored transit transaction data can later be submitted for batch processing by the transit central computer 270, where such batch processing may also include analysis of the stored transit transaction data such as for ridership trends, fare evaluation, and collection of fares.

At step 640, the transit central computer 270 performs one or more maintenance procedures on one or more lists stored in the database 305. For these maintenance procedures, the transit agency may have various policies that require an account, indicators thereof, and the like to be added to or remove from such lists. For example, one such list may include a plurality of indicators for accounts that include all or a portion of the PAN associated with the account. One such list can be a negative list and another such list can be a white list. Reasons for list maintenance are readily understood by those of skill in the relevant arts and can be as are mentioned above, such as reasons derived internally by the transit system as well as reasons based upon information received by the transit system in communications from the payment processing system 180. For example, the issuer 170 of a bank card may communicate to the transit system information to the effect that the bank card is to be denied any and all transactional use. This information would then be used by the transit system to add the account of the bank card to the negative list stored in the database 305. By way of another illustration, the issuer 170 may have declined use of the FIPPD 130 at a grocery store the previous day because the debit account associated with the FIPPD 130 was overdrawn. The payment processing system 180 may transmit a communication of the denial to the transit central computer 270 indicating that the FIPPD 130 should not be validated for use. Subsequently, the transit central computer 270 can add the account for the FIPPD 130 to the negative list that is maintained in the database 305. In like manner, the payment processing system 180 may send a risk analysis on the FIPPD 130 that the transit central computer 270, based upon a policy program, may deem to be above a tolerated threshold exposure or risk, resulting in the transit central computer 270 adding the FIPPD 130 to the negative list.

Optionally, at step 650, the transit fare for the access transaction can be calculated based on transit transaction history and transit system policy by use of related transact transaction data obtained for a rider's FIPPD 130 at each step 610. As stated previously, a transit fare can be determined by applying transit rules to transit events involving FIPPD 130 over a period of time. Here, the calculation can occur at the transit central computer 270 by execution of a fare policy program.

At step 660, the transit central computer 270 addresses a communication to the transit POS 240. The communication, which generally includes a transit validation or denial thereof for the rider's access to a transmit facility, may include, for example, the result of the negative list check so as to indicate whether the rider may be permitted access to the transit facility due to transit validation contained in the communication. The communication may also indicate that the rider will be assessed a discounted fare based upon the rider's status (e.g.; an elder or minor rider fare) or an undiscounted fare.

Process 600 repeats steps 610 through 660 for each rider presenting the FIPPD 130 at the transit reader 220. Preferably, these steps, including the step of conducting the transit validation check, will occur in a short period of time, more preferably in less that about one second, and most preferably in an access period of about 300 ms.

Following process 600 for a plurality of riders and their respective transit transactions, as seen in FIG. 4 at steps 450-460, fares for such riders can be submitted by the transit system for collection from the payment processing system 180.

Figure 7:
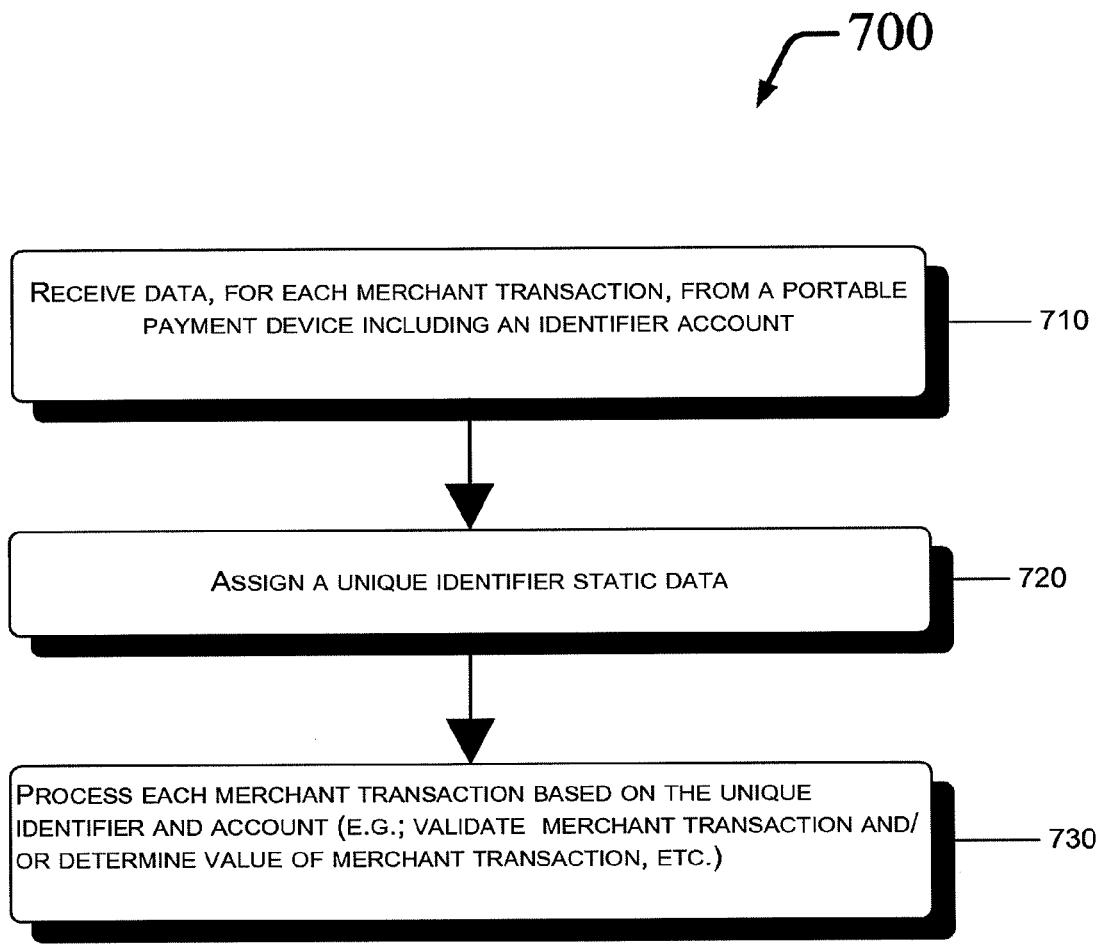
FIG. 7 is a flow chart illustrating an exemplary method for utilizing a Global Unique Identifier to process a merchant's transaction.

Referring to FIG. 7, an exemplary method 700 for utilizing a Global Unique Identifier to process a merchant's transaction is illustrated. Some financial institutions provide multiple FIPPDs 130 that are associated with a single account. For example, a husband and wife may each have their respective FIPPDs 130 linked to their joint checking account. When the husband and wife receive their statement, the issuer 170 may divide out transactions by consumer use in the account statement—reporting the transactions performed using the husband's FIPPD 130 separate from the transactions performed using the wife's FIPPD 130. Therefore, the issuer 170 is capable of distinguishing each FIPPD 130 associated with an account from the other FIPPDs 130 associated with the account. Other examples of multiple FIPPDs 130 associated with one account may include corporate bank cards given to a plurality of employees or health care payment account, such as a flexible spending account of a defined benefit plan, with multiple FIPPDs 130 for each insuree.

Typically, payment processing system industry standards govern formatting of information stored on the FIPPD 130. The track data obtained from the FIPPD 130 may have a predetermined data field configuration such as a configuration that conforms to the Magnetic Stripe Data (MSD). A number of International Organization for Standardization (ISO) exit that define track data formatting such as, ISO 7811, ISO 7812, ISO 7813, and ISO 4909. For example, the first 16 digits region within the first track of the FIPPD 130 may be a field for a PAN. An example of pre-defined payment processing system 180 format may include:

| Track 1: | | | | | |
|---|---|---|---|---|---|
| PAN (16 digits Typical) | Name (2-26 Characters) | Codes, Separators, Expiry Date (10 Digits) | Additional Data (7 Digits) | Issuer Discretionary Data (Variable) | Reserved (4 Digits) |

| Track 2: | | | |
|---|---|---|---|
| PAN (16 Digits Typical) | Expiry Date, Service Code, Separator (8 Digits) | Additional Data (7 Digits) | Issuer Discretionary Data (6 digits) |

The issuer 170 may assign codes within the track data to allow it to uniquely identify the FIPPDs 130 associated with an account. These codes may typically be found in the issuer discretionary track space (ITD) or in the cardholder name fields within the track data. Therefore, the issuer 170 may place the PAN and the ITD and/or cardholder name fields in static memory of the FIPPD 130 such that they are consistently read by merchants and reported in settlement/collection processes to the issuer 170. The issuer may then utilize the track data reported that includes these codes to uniquely identify each FIPPD 130 associated with one account.

However, each issuer 170 may apply codes to the ITD or cardholder name fields in a different manner. There is typically no standard for applying such codes or determining what the codes mean. For example, only the issuer 170 may understand that a "XYZ" within the ITD signifies that the FIPPD 130 with "XYZ" is the primary cardholder while a "BBB" signifies that the FIPPD 130 is an employee cardholder with limited access to the account, where "BBB1" is a first employee and "BBB2" is a second employee on the account. Consequently, the merchant 140 may have difficulties in utilizing the same codes to distinguish different FIPPDs 130 with the same PAN. Process 700 illustrates one implementation to uniquely identify the FIPPD 130 from among a plurality of FIPPDs 130 with the same PAN.

At step 710, for each of a plurality of merchant transactions, track data from the FIPPD 130 is received. The track data may be from a single track, two tracks, or three tracks, for example. The track data may include data from the PAN field, the ITD and/or cardholder field.

At step 720, a unique Globally Unique Identifier (GUID) is assigned to the track data read. The GUID may be the all or part of the track data read in step 710 that is unique or it may be a proxy for all or part of the track data that is unique.

A FIPPD's 130 read track data is unique when consecutive usages of the FIPPD 130 can be distinguished from among usage of a plurality of FIPPDs 130. As stated previously, the issuer 170 of the FIPPD 130 places codes within fields of the track data associated with the FIPPD 130 in order to identify the FIPPD 130. Identifying the FIPPD 130 may include distinguishing the FIPPD 130 associated with an account from another FIPPD 130 also associated with the same account. Identifying the FIPPD 130 may also include determining the name of the consumer with the FIPPD 130 or determining the billing address of the consumer with the FIPPD 130. The merchant 140 can use the issuer 170 codes to distinguish the consumer without having to identify the consumer. Therefore, even if the merchant 140 does not have access to each issuer's 170 standards for deciphering the codes, such as determining the billing address of the consumer, it will still be able to uniquely identify the FIPPD 130 and distinguish the FIPPD 130 in subsequent transactions with the merchant 140.

To illustrate, the GUID may be the entire track data read at step 710. At time T1 the FIPPD 130 with GUID is used at the merchant's 140 POS reader. The transaction is processed. At a subsequent time T2, the same FIPPD 130 is used at the merchant's 140 POS reader. The track data is once again read at the merchant 140 POS. Because the combination PAN and ITU is unique to the FIPPD 130, track data read (the GUID) at time T1 and the track data read at time T2 (the same GUID) will match and the two transactions can be categories as being from the same FIPPD 130. Alternatively, if a proxy is used the track data can be converted to a unique code using an algorithm. Therefore, the track data can be read and converted at time T1 resulting in the GUID for the track data. At a subsequent time T2, when the same track data is converted to its GUID using the algorithm, the same GUID will result. Therefore, the transaction at T1 will be detected as involving the same FIPPD 130 as the transaction at T2.

The merchant 140 may also keep in mind that some locations within track data, for example those read from a contactless FIPPD 130, possess data that is modified or changed with each use, such as a counter that indexes the frequency of use of the contactless FIPPD 130. The merchant 140 will preferably determine the FIPPD 130 GUID without relying on such data that changes with each transaction.

At step 730, the merchant transaction is processed based on the corresponding GUID. In this manner, the merchant transaction is attribute to the FIPPD 130 (via the GUID) used during the transaction and to the account associated with the FIPPD 130 used during the transaction. The processing based on the GUID may take different forms.

In one embodiment, the GUID may be used to determine whether the merchant 140 is to authorize a transaction involving the FIPPD 130 with the GUID. For example, the GUID may be used as an index in referring to accounts as they are added and removed from a negative list and/or white list based on merchant policies. For example, in the transit environment, the transit agency may add a GUID onto a negative list because a previous balance inquiry to the issuer 170 regarding the FIPPD 130 indicated that the account associated with the FIPPD 130 did not have sufficient funds to cover a transaction on the account. When the rider with the FIPPD 130 tries to gain access to the transit facility, the negative list may be checked using the corresponding GUID for the FIPPD 130 associated with the overdrawn account. The GUID will be found on the negative list and the rider with the FIPPD 130 associated with the overdrawn account will be denied access into the transit facility.

In another embodiment, the transaction value can be processed based on the GUID. In the transit environment, the fare calculation, described above, may be processed based on the GUID. For instance, a family of five (5) of different ages can each carry a contactless bank card associated with the same account number. Each family member may enter the transit facility on the same day. The transit system may assess fares based upon entry and exit points as well as age of the rider. If each family member enters and exits from different points in the transit system multiple times throughout the day fare calculation will become impractical without a means for distinguishing each family member with bank cards associated with the same account number.

Applying the implementation described in steps 710 through 730 above, each family member may waive their corresponding contactless card at the transit reader 220. The transit reader 220 may read the access transaction application data, or track data, off of the contactless cards. Each family member's read track data will then be assigned a unique GUID. Child A may have a bank card with track 1 having "XYZ123" and track 2 having "ABC456" while child B may have track 1 "XYZ123" and track 2 having "ABC999." Both child A and child B enter the transit system at 9:00 a.m., wherein the transit system logs the following 2 entries: (1) PAN="XYZ123"; discretionary data="ABC456" and (2) PAN="XYZ123"; discretionary data="ABC999." At 3:00 p.m. the transit system logs only one entry "XYZ123"; "ABC456" (child B receiving a ride home from a friend). By comparing track data read at time 9:00 a.m. for both children track data read at 3:00 p.m., the transit system can determine that child A used the transit system twice, while child B used the transit system once. The transit agency may thereby calculate the right fare for child A and for child B. Once the transit fare is properly determined, the transit agency may send the fare value to the payment processing system 180 for settlement and collection as described above.

Process 700 repeats steps 710 through 740 for each consumer presenting a FIPPD 130 at the merchant reader. Preferably, these steps, including both reading, processing (e.g., validation), will occur in a short period of time, more preferably in less that about one second, and most preferably in an access period of about 300 ms.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for processing transactions, comprising:
   at least one computer processor; and
   at least one computer-readable medium storing computer-executable instructions that, when executed with the at least one computer processor, cause the system to, at least:
   receive data read from a data storage region of a payment device that includes (i) a primary account number (PAN) comprising an identifier of the issuer and an identifier of a consumer account usable to conduct transactions with a plurality of merchants and (ii) a payment device distinguishing code distinct from the PAN uniquely identifying the payment device with respect to the PAN among a plurality of payment devices that are associated with the PAN;
   determine a globally unique identifier (GUID) of the payment device based at least in part on both the PAN and the payment device distinguishing code read from the data storage region of the payment device; and
   make a determination with respect to fraud based at least in part on the GUID, wherein a plurality of GUIDs are associated with a same PAN and the determination with respect to fraud is different for different GUIDs of the plurality of GUIDs associated with the same PAN.

2. A system in accordance with claim 1, wherein the payment device distinguishing code comprises an identifier associated with a mobile device.

3. A system in accordance with claim 1, wherein the data read from the data storage region of the payment device is received at a point of sale terminal.

4. A system in accordance with claim 3, wherein the globally unique identifier of the payment device is determined at a computer system that is distinct from the point of sale terminal.

5. A system in accordance with claim 3, wherein the determination with respect to fraud occurs at a computer system that is distinct from the point of sale terminal.

6. A system in accordance with claim 3, wherein the globally unique identifier of the payment device is determined at the point of sale terminal.

7. A system in accordance with claim 1, wherein the determination with respect to fraud is further based at least in part on at least one of a positive list or a negative list of GUIDs.

8. One or more computer-readable media storing computer-executable instructions that when executed by one or more computers cause the one or more computers to, at least:
   receive data read from a data storage region of a payment device that includes:
   a primary account number (PAN) comprising an identifier of the issuer and an identifier of a consumer account usable to conduct transactions with a plurality of merchants; and
   a payment device distinguishing code distinct from the PAN uniquely identifying the payment device with respect to the PAN among a plurality of payment devices that are associated with the PAN;
   determine a globally unique identifier (GUID) of the payment device based at least in part on both the PAN and the payment device distinguishing code read from the data storage region of the payment device; and
   make a determination with respect to fraud based at least in part on the GUID, wherein a plurality of GUIDs are associated with a same PAN and the determination with respect to fraud is different for different GUIDs of the plurality of GUIDs associated with the same PAN.

9. One or more computer-readable media in accordance with claim 8, wherein the payment device is within a mobile device selected from the group consisting of a personal digital assistant, a wireless telephone, a contactless smart card device and an expert system including a substrate having embedded therein a contactless element including a chip capable of facilitating the transactions with the plurality of merchants.

10. One or more computer-readable media in accordance with claim 8, wherein the one or more computers are further caused to indicate a transaction approval status to a user of the payment device.

11. One or more computer-readable media in accordance with claim 10, wherein the transaction approval status is presented to the user by the point of sale terminal.

12. One or more computer-readable media in accordance with claim 8, wherein the determination of the GUID is in accordance with a payment system standard and is independent of a merchant participating in a transaction.

13. One or more computer-readable media in accordance with claim 8, wherein the globally unique identifier is unique independent of each of the plurality of merchants.

14. One or more computer-readable media in accordance with claim 8, wherein the identifier of the issuer comprises an identifier that uniquely identifies the issuer among a plurality of issuers of payment devices.

15. A method for processing transactions, comprising:
receiving data read from a data storage region of a payment device that includes:
a primary account number (PAN) comprising an identifier of the issuer and an identifier of a consumer account usable to conduct transactions with a plurality of merchants; and
a payment device distinguishing code distinct from the PAN uniquely identifying the payment device with respect to the PAN among a plurality of payment devices that are associated with the PAN;
determining a globally unique identifier (GUID) of the payment device based at least in part on both the PAN and the payment device distinguishing code read from the data storage region of the payment device; and
making a determination with respect to fraud based at least in part on the GUID, wherein a plurality of GUIDs are associated with a same PAN and the determination with respect to fraud is different for different GUIDs of the plurality of GUIDs associated with the same PAN.

16. A method in accordance with claim 15, wherein the identifier of the consumer account comprises an identifier that uniquely identifying the consumer account among a plurality of consumer accounts maintained by the issuer.

17. A method in accordance with claim 15, wherein the identifier of the issuer comprises an Issuer Identification Number (IIN) in accordance with an ISO 7812 standard.

18. A method in accordance with claim 17, wherein the Issuer Identification Number (IIN) comprises 6 numeric digits.

19. A method in accordance with claim 18, wherein the PAN comprises no more than 19 numeric digits.

20. A method in accordance with claim 15, wherein the PAN has a format in accordance with an ISO 7812 standard.

* * * * *